United States Patent [19]

Markl

[11] Patent Number: 4,869,816
[45] Date of Patent: Sep. 26, 1989

[54] TRANSMISSION FLUID FILTER JOINT

[75] Inventor: Norbert Markl, Woodbridge, Canada

[73] Assignee: Magna International (Canada) Inc., Markham, Canada

[21] Appl. No.: 124,950

[22] Filed: Nov. 24, 1987

[51] Int. Cl.⁴ .................. B01D 25/04; F01M 11/03
[52] U.S. Cl. .................................. 210/168; 210/445; 210/453; 209/403
[58] Field of Search ............... 209/389, 399, 402, 403, 209/404, 405; 210/167, 168, 445, 232, 453, 461; 55/503, 511, DIG. 31

[56] References Cited

U.S. PATENT DOCUMENTS

| | | | |
|---|---|---|---|
| 135,925 | 2/1873 | Mann | 209/403 |
| 1,194,552 | 8/1916 | Schuiling | 209/405 |
| 2,217,920 | 10/1940 | Roubal | 209/403 |
| 2,271,900 | 2/1942 | Mowbray | 209/403 |
| 2,677,462 | 5/1954 | Conkling | 209/403 |
| 3,014,592 | 12/1961 | Stephens | 210/168 |
| 3,371,793 | 3/1968 | Fowler | 210/168 |
| 3,480,149 | 11/1969 | Houser | 210/445 |
| 3,483,912 | 12/1969 | Andrews | 209/403 |
| 3,784,011 | 1/1974 | Ward | 210/168 |
| 4,131,980 | 1/1979 | Zinnbauer | 29/463 |
| 4,136,011 | 1/1979 | Joseph | 210/168 |
| 4,264,443 | 4/1981 | Anderson | 210/168 |
| 4,387,023 | 6/1983 | Napier | 210/168 |
| 4,400,864 | 8/1983 | Peyton et al. | 29/508 |
| 4,402,827 | 9/1983 | Joseph | 210/445 |
| 4,450,081 | 5/1984 | Anderson et al. | 210/445 |
| 4,650,572 | 3/1987 | Hayes | 210/445 |

*Primary Examiner*—David L. Lacey
*Assistant Examiner*—Thomas M. Lithgow
*Attorney, Agent, or Firm*—Cushman, Darby & Cushman

[57] ABSTRACT

A transmission fluid filter assembly in which the marginal peripheries of two sheet metal housing members are crimped into a plied peripheral structure which includes therein the abutting edge portions of a folded filter media sheet member along three of the four sides thereof. The plied peripheral structure is formed by bending a first marginal free edge portion of a first sheet metal member over a second marginal free edge portion of the second sheet metal member in compressing relation with respect to the abutting edge portions of the filter media sheet member. Therafter, the plied peripheral structure is angularly bent intermediate the bent-over outer edge and the free edge of the first marginal edge portion in a direction to form an included angle of 90° between the exterior surface of an outer section and the exterior surface of an inner section of the first marginal edge portion.

17 Claims, 2 Drawing Sheets

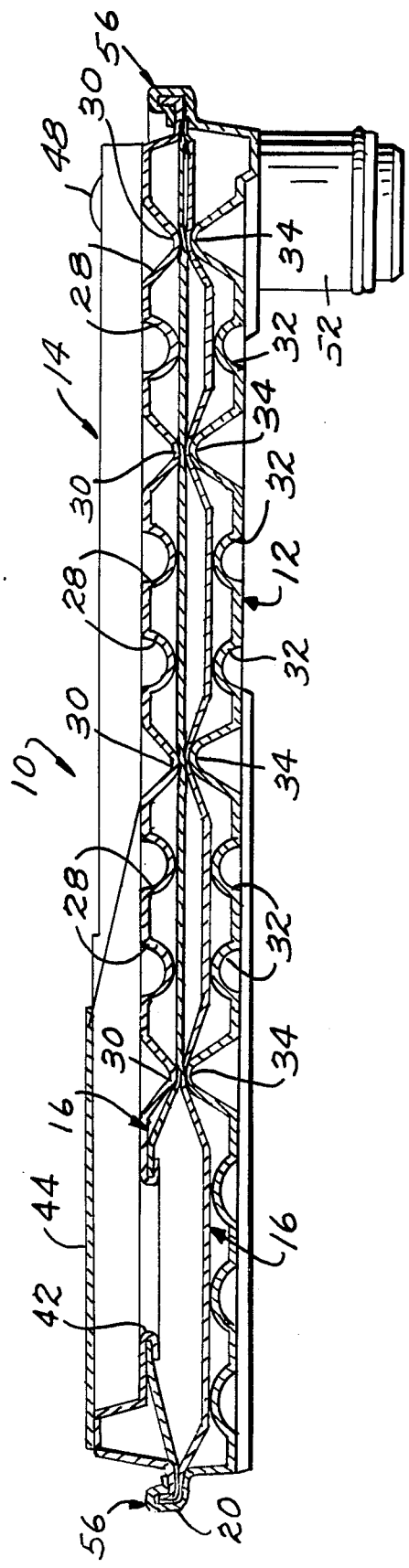
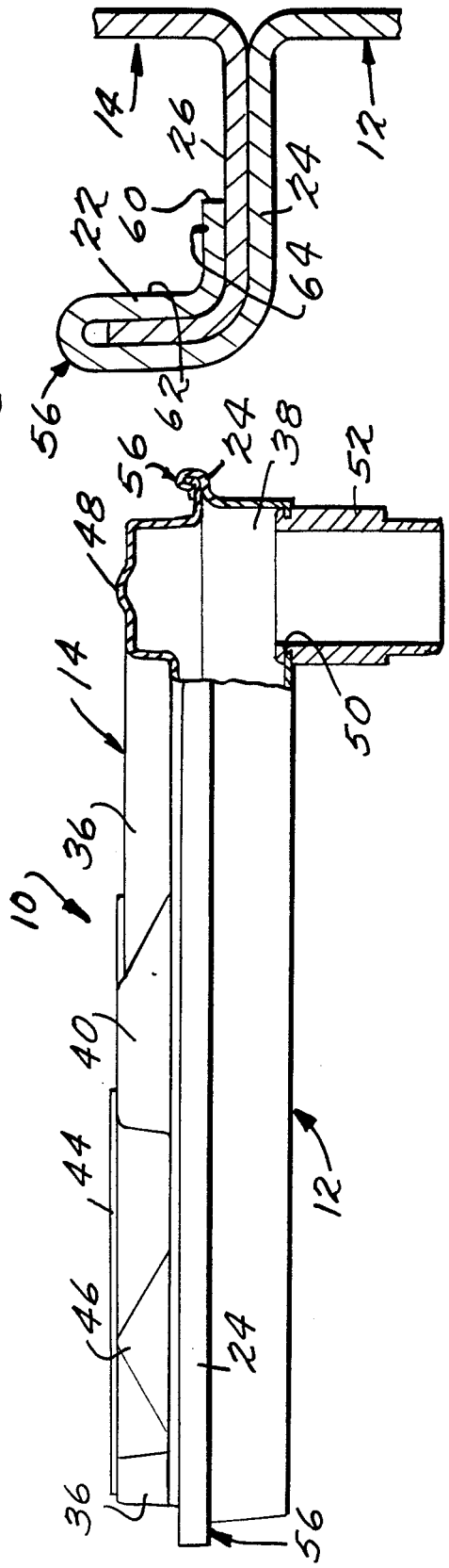

TRANSMISSION FLUID FILTER JOINT

This invention relates to fluid filters and, more particularly, to fluid filters of the type used in transmissions to filter the transmission fluid.

Transmission fluid filters are well known and generally consist of two main housing members and a sheet of folded filter media material. The folded filter media sheet is mounted with the abutting marginal edge portions thereof disposed between approximately three-quarters of the marginal peripheral edges of the two housing members. The entire peripheral edges of the housing members are then crimped together to provide a peripheral seal. Flow through the filter assembly is first through an inlet into the interior provided by the filter media sheet inwardly of the folded edge and crimped abutting edges thereof. After passing through the filter media sheet, the fluid exits from the space between the exterior of the filter media sheet and the interior of the peripherally sealed housing members through a suction spout. The filter assembly is operatively positioned in the transmission unit in the fluid collecting pan or bottom of the housing and a pump is provided for drawing the fluid upwardly through the filter spout with the flow of fluid into the filter inlet being accomplished from the pool of transmission fluid in the pan.

Heretofore, the filter housing members have been made of stamped sheet metal. In units of this type, the seal around the periphery of the two housing sheet metal members has utilized a resilient peripheral sealing element in order to insure a fluidtight seal as is necessary to prevent contaminated fluid from bypassing the filter media. The necessity to assemble the fluid filter components with a resilient peripheral seal complicated the assembly, led to waste and increased the cost. In order to alleviate this problem, it has been the practice in recent years to mold one of the housing members out of plastic material. This enabled the peripheral edge of the plastic molded housing member to be shaped in a bead formation so that the other metal housing member could be crimped thereover to form a peripheral seal without the necessity of a separate resilient sealing element. See, for example, U.S. Pat. Nos. 4,450,081 and 4,402,827. While an arrangement of this type has eliminated the assembly problems, wastage and cost incident to the prior practice of providing a resilient peripheral sealing element, nevertheless the necessity to mold a plastic component has increased the cost of the components. There still exists a need to provide a transmission fluid filter assembly which eliminates the disadvantages inherent in both types of prior art fluid filter assemblies as noted above.

It is an object of the present invention to fulfill the aforesaid need. In accordance with the principles of the present invention, this objective is accomplished by providing a transmission fluid filter assembly in which the housing members are both formed of sheet metal and the marginal peripheries of the two sheet metal members are crimped into a plied peripheral structure. The plied peripheral structure is formed from a first marginal free edge portion and an adjacent marginal edge portion of a first sheet metal member and a second marginal free edge portion of a second sheet metal member. The members are assembled with the second marginal free edge portion of the second sheet metal member disposed in generally coextensive facing relation with the adjacent marginal edge portion of the first sheet metal member and with the remaining abutting edge portions of the folded filter media sheet member therebetween and the folded edge portion of the filter media sheet member disposed therewithin. The first marginal free edge portion of the first sheet metal member is then bent over the second marginal free edge portion of the second sheet metal member in compressing relation with respect to the remaining abutting edge portions of the filter media sheet member so as to form the plied peripheral structure. In accordance with the principles of the present invention, the plied peripheral structure is then angularly bent intermediate the bent-over outer edge and the free edge of the first marginal edge portion in a direction to form an included angle between the exterior surface of an outer section and the exterior surface of an inner section of the first marginal edge portion sufficient to cause the bias imparted thereto by the angular bend to act in such a way as to increase the interengagement of the plied peripheral structure enabling the latter to provide a fluidtight peripheral seal therewithin without the use of a separate resilient sealing element. In this way, the present invention eliminates both the need for the resilient sealing element and secures the cost advantage of utilizing a second sheet metal housing member instead of the more expensive molded plastic member.

Another object of the present invention is to provide a transmission fluid filter assembly of the type described which is simple in construction, effective in operation and economical to manufacture.

These and other objects of the present invention will become more apparent during the course of the following detailed description and appended claims.

IN THE DRAWINGS:

FIG. 2 is an enlarged sectional view taken along the line 2—2 of FIG. 1;

FIG. 3 is an enlarged sectional view taken along the line 3—3 of FIG. 1;

FIG. 5 is an enlarged fragmentary sectional view taken along the line 5—5 of FIG. 1.

Figure 1:
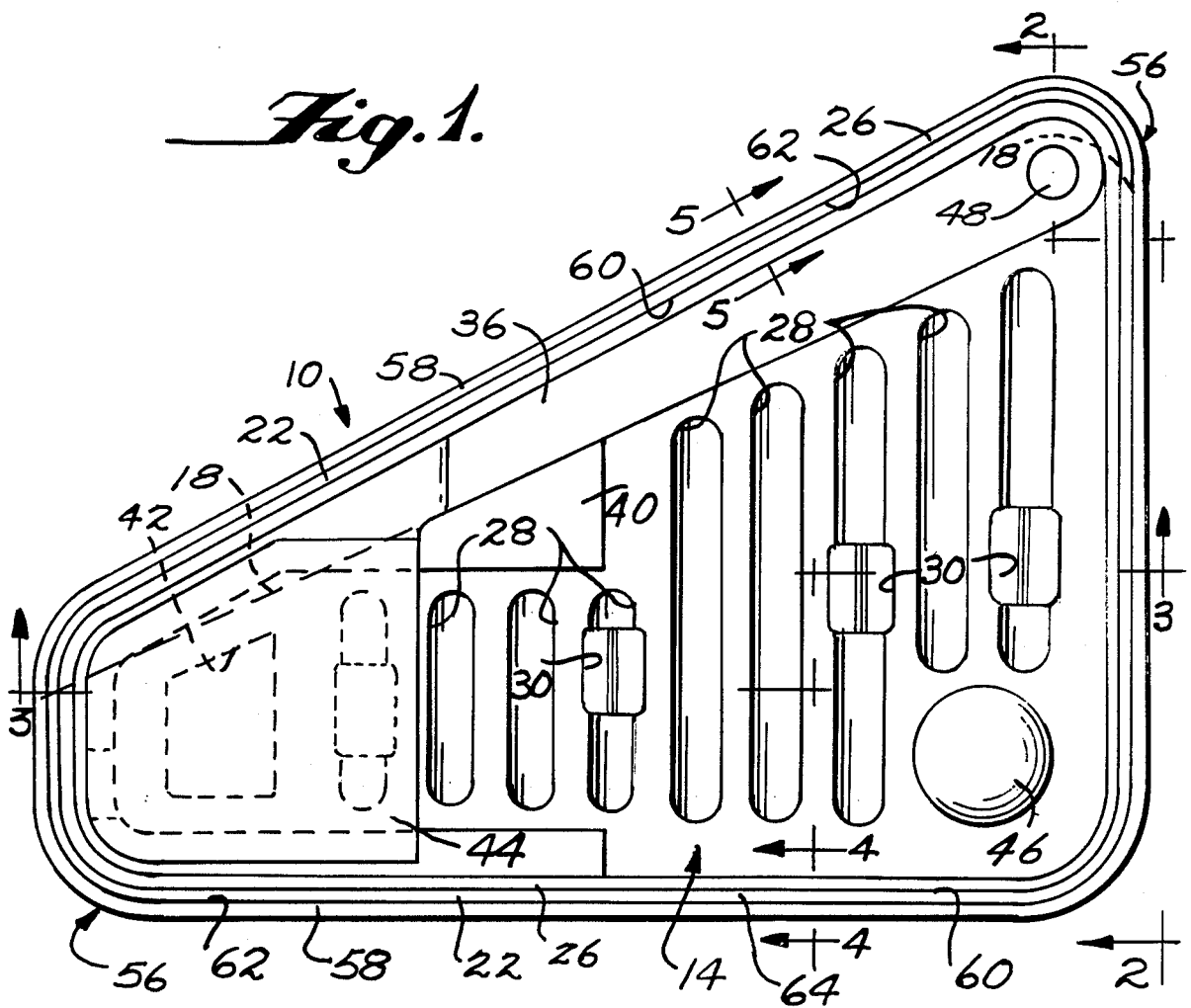
FIG. 1 is a bottom plan view of a transmission fluid filter assembly embodying the principles of the present invention.

Referring now more particularly to FIG. 1 of the drawings, there is shown therein in bottom plan view a transmission fluid filter assembly, generally indicated at 10, which embodies the principles of the present invention. As shown, the assembly 10 includes a first or top sheet metal housing member, generally indicated at 12, and a bottom or second sheet metal housing member, generally indicated at 14. As best shown in FIG. 1, the two housing members 12 and 14 in plan have a quadrilateral configuration in which three sides are perpendicular to one another with the fourth side being angular and intersecting a short perpendicular side at an obtuse angle and an opposite longer side at an acute angle. As shown, the corners are all rounded. As indicated, while a configuration of this shape is preferred, other shapes may be utilized if desired.

The filter assembly 10 also includes a filter media sheet member, generally indicated at 16, which is folded along one edge, as indicated at 18 by the dotted line in FIG. 1, so as to provide remaining abutting edge portions 20 which have generally the same shape as the shape of the housing members 12 and 14 except that the short and long walls are of lesser dimension.

The top sheet metal housing member 12 is formed to provide a first marginal free edge portion 22 and an adjacent marginal edge portion 24. The bottom sheet metal housing member 14 is formed to provide a second marginal free edge portion 26. Formed in the bottom sheet metal housing member 14 is a series of elongated indentations 28. Formed in certain of the indentations 28 are spaced V-shaped filter media securing indentations 30. Similar elongated indentations 32 and V-shaped filter securing indentations 34 are also formed in the top sheet metal housing member 12 in positions to register with the respective indentations 26 and 28 in the bottom sheet metal member 14. Formed along the angular side of the bottom sheet metal housing member 14 is an elongated projection 36 which extends along the adjacent marginal edge portion 24 of the angular side then along the short side and then halfway along the adjacent perpendicular side where it inclines down to a terminus at the level of the sheet metal member. Annular elongated projection 38 is formed in the top sheet metal housing member 12, however, its extent is limited to being coextensive with the slanted side.

At a position transversely opposite the inclined end of the elongated projection in the bottom housing member 14 is another inclined portion 40 formed in the sheet metal which extends from the main body of the sheet metal member up to the projection 36 at an adjacent portion thereof. At a position within the U-shaped bend of the projection 36, the bottom sheet metal member 14 is formed with a quadrilaterally shaped opening and the filter media sheet member is likewise provided with a registering opening. The marginal edge portion of the sheet metal of the bottom housing member is crimped over the opening in the adjacent ply of the filter media member to form an inlet 42. It will be noted that a guide cover plate 44 is brazed or otherwise fixed to the projecting surface of the U-shaped portion of the projection 36 at a position overlying the inlet 42 where the transversely spaced inclines meet the projections. In order to provide for an even support of the bottom member, a corner projection 46 is provided in the opposite perpendicular corner and a smaller projection 48 is formed in the elongated projection 32 at the adjacent end thereof.

As best shown in FIG. 2, the top sheet metal member 12 is formed with an opening 50 therein within which a spout 52 of metal is mounted. The spout 52 includes an axially extending flange 34 which is inserted within the opening and bent over the metal defining the opening 50 so as to secure the spout 52 to the sheet metal member 12. It will be understood that the configuration thus far described is illustrative of conventional designs and it will be understood that the configuration can be varied as desired.

The present invention is more particularly concerned with the manner in which the two sheet metal housing members 12 and 14 are secured together in peripherally sealed relation with respect to the abutting edge portions 20 of the folded filter media sheet member 16. As best shown in FIG. 1, the members 12, 14, and 16 are assembled with the second marginal free edge portion 26 of the bottom sheet metal housing member 14 disposed in generally coextensive facing relation with the adjacent marginal edge portion 24 of the top sheet metal member 12 and with the remaining abutting edge portions 20 of the filter media sheet member 16 therebetween and with the folded edge portion 18 of the filter media sheet member 16 disposed therewithin in adjacent spaced relation along the angular sides thereof as shown in the broken line 18 indication in FIG. 1. The first marginal free edge portion 22 of the top sheet metal housing member 12 is then bent over the second marginal free edge portion 26 of the bottom sheet metal housing member 14 in compressing relation with respect to the remaining abutting edge portions 20 of the filter media sheet member 16 so as to form a plied peripheral structure, generally indicated at 56. This bending operation defines the first marginal free end portion 22 as being that peripheral portion of the top sheet metal member 12 between the bent over edge, indicated at 58, and the free edge, indicated at 60.

Figure 4:
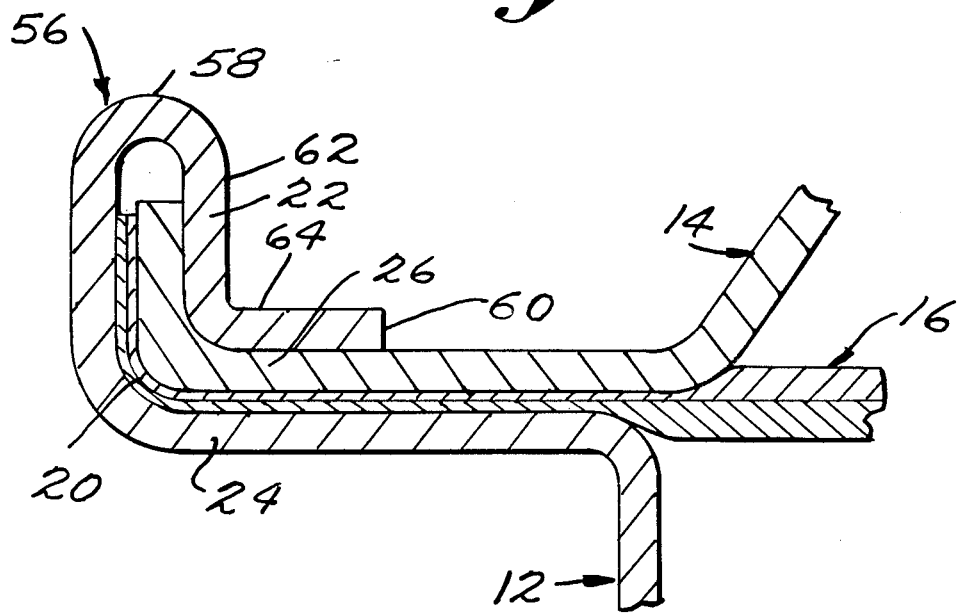
FIG. 4 is an enlarged fragmentary sectional view taken along the line 4—4 of FIG. 1.

In accordance with the principles of the present invention, the plied peripheral structure 56 is then bent angularly intermediate the bentover outer edge 58 and the free edge 60 of the first marginal edge portion 22 in a direction to form an included angle between an exterior surface 62 of an outer section and an exterior surface 64 of an inner section of the first marginal edge portion 22. Stated differently, the direction of the bend is toward the bottom sheet metal member 14. As shown, a preferred included angle is of 90°. The angle can be varied so long as it is sufficient to cause the bias imparted to the plied peripheral structure 56 by the angular bend to act in such a way as to increase the interengagement of the plied peripheral structure 56 enabling the latter to provide a fluidtight peripheral seal therewithin without the use of a separate resilient sealing element. It will be noted that the inner and outer sections of the first marginal free edge portion 22 are biased in such a way as to tend to increase the angle between the surfaces 62 and 64. This bias moves the marginal free end portion 22 more tightly into the engagement with the bent portion of the second marginal free edge portion 26 against which it abuts. This interengagement serves to provide an effective seal which is effective not only where the filter media sheet material is compressed therebetween as shown in FIG. 4, but, more importantly, in those extents of the periphery where there are no abutting edge portions of the filter media material in the plied peripheral structure 56. This is along the angular side and the cross-sectional configuration is illustrated in FIG. 5.

In operation, it will be understood that the fluid filter assembly 10 is mounted within the space of the transmission unit where the main body of the transmission fluid is retained, i.e. the pan or bottom of the housing. The assembly 10 is mounted with the bottom housing member 14 lowermost and the spout 52 extending upwardly. The spout 52 is connected with suitable conduit (not shown) leading from the suction side of the pump which causes the flow of transmission fluid in the main body of the transmission housing to enter through the inlet 42 into the interior of the filter media sheet member 16 inwardly of the folded edge portion 18 thereof and the abutting edge portions 20 thereof compressed within the plied peripheral structure 56. The fluid passes from the interior space through the filter media, with the V-shaped indentations serving to grip the filter media and retain it in a proper relationship and the other indentations serving to permit a controlled billowing of the filter media sheet material in such a way that it does not collapse upon the support but provides for flow therethrough to the space defined by the exterior thereof and the interior of the top and bottom sheet metal members within the plied peripheral structure thereof. In this regard, the projections 36 and 38 define with the folded edge portion 18 of the filter media sheet member 16, a header space leading to the spout 52. It is noted that the entire space between the exterior of the filter member 16 and exterior of the housing members 12 and 14 which is communicated directly to the source of suction is provided with an effective peripheral seal which prevents the flow of contaminated transmission fluid directly into this space bypassing the filter media, by virtue of the plied peripheral structure 56 constructed in accordance with the principles of the present invention.

It thus will be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. A transmission fluid filter assembly comprising
   a first sheet metal member having a periphery providing a first marginal free edge portion and an adjacent marginal edge portion,
   a second sheet metal member having a periphery providing a second marginal free edge portion,
   a filter media sheet member folded so as to define a periphery providing a folded edge portion and remaining abutting edge portions,
   said members being assembled with the second marginal free edge portion of said second sheet metal member disposed in generally coextensive facing relation with the adjacent marginal edge portion of said first sheet metal member and with the remaining abutting edge portions of said filter media sheet member between said coextensive marginal portions and the folded edge portion of said filter media sheet member disposed within said coextensive marginal portions,
   the first marginal free edge portion of said first sheet metal member being bent over the second marginal free edge portion of said second sheet metal member in compressing relation with respect to the remaining abutting edge portions of said filter media sheet member so as to form a plied peripheral structure,
   said plied peripheral structure being angularly bent intermediate the bent over outer edge and the free edge of said first marginal free edge portion in a direction toward the second sheet metal member to form an angularly bent portion, said angularly bent portion being at an angle with the folded edge portion of the filter media sheet member, said angle being sufficient to cause the bias imparted to said first marginal free edge portion by said angular bend to act in such a way as to increase the interengagement of the angularly bent plied peripheral structure enabling the angularly bent peripheral structure to provide a fluidtight peripheral seal within the angularly bent plied peripheral structure without the use of a separate resilient sealing element, and
   means for directing a fluid to be filtered into the interior space defined by the filter media sheet member within the folded edge portion thereof and the remaining abutting edge portions thereof compressed within said angularly bent plied peripheral structure and out of the space between the interior of said sheet metal members and the exterior of said filter media sheet member within the angularly bent plied peripheral structure after having passed through said filter media sheet member.

2. A transmission fluid filter assembly as defined in claim 1 wherein the angle is approximately 90°.

3. A transmission fluid filter assembly as defined in claim 2 wherein said fluid directing means includes a first opening in a first inner portion of one of said sheet metal members inwardly of said angularly bent plied peripheral structure, a second opening in an adjacent second inner portion of said filter media sheet member registering with said first opening, and a third opening formed in a third portion of one of said sheet metal members inwardly of said angularly bent plied peripheral structure disposed in spaced relation to the registering first and second openings, said registering first and second openings providing a contaminated fluid inlet and said third opening providing a filtered fluid outlet.

4. A transmission fluid filter assembly as defined in claim 3 wherein said inlet is provided by bending said first inner portion of the sheet metal member defining said first opening over said adjacent second inner portion of the filter media sheet member defining said second opening.

5. A transmission fluid filter assembly as defined in claim 4 wherein said third opening receives an axial flange formed on one end of a cylindrical spout, said axial flange being bent over said third inner portion of the sheet metal member defining said third opening to fixedly secure said spout thereto.

6. A transmission fluid filter assembly as defined in claim 5 wherein said sheet metal members are formed with registering elongated indentations, certain of said indentations having V-shaped filter media engaging indentations therein.

7. A transmission fluid filter assembly as defined in claim 6 wherein said sheet metal members are of quadrilateral configuration in plan including opposite short and long sides each perpendicular to a third side and a fourth angular side intersecting said short side at an obtuse angle and said longer opposite side at an acute angle.

8. A transmission fluid filter assembly as defined in claim 7 wherein said filter media sheet member is spaced inwardly and generally parallel with the angularly bent plied peripheral structure extending along the angular side of said sheet metal members.

9. A transmission fluid filter assembly as defined in claim 8 wherein the sheet metal members inwardly of the angularly bent plied peripheral structure along the angular side thereof are formed with projections defining a header leading to said outlet, the projection in said one sheet metal member extending inwardly of the angularly bent plied peripheral structure along the adjacent perpendicular side, and a cover plate fixed to the exterior surface of said projection in said one sheet metal member in spaced coextensive relation to the first opening therein.

10. A transmission fluid filter assembly as defined in claim 1 wherein said fluid directing means includes a first opening in a first inner portion of one of said sheet metal members inwardly of said angularly bent plied peripheral structure, a second opening in an adjacent second inner portion of said filter media sheet member registering with said first opening, and a third opening formed in a third portion of one of said sheet metal members inwardly of said angularly bent plied peripheral structure disposed in spaced relation to the registering first and second openings, said registering first and second openings providing a contaminated fluid inlet and said third opening providing a filtered fluid outlet.

11. A transmission fluid filter assembly as defined in claim 10 wherein said inlet is provided by bending said first inner portion of the sheet metal member defining said first opening over said adjacent second inner portion of the filter media sheet member defining said second opening.

12. A transmission fluid filter assembly as defined in claim 11 wherein said third opening receives an axial flange formed on one end of a cylindrical spout, said axial flange being bent over said third inner portion of the sheet metal member defining said third opening to fixedly secure said spout thereto.

13. A transmission fluid filter assembly as defined in claim 1 wherein said sheet metal members are formed with registering elongated indentations, certain of said indentations having V-shaped filter media engaging indentations therein.

14. A transmission fluid filter assembly as defined in claim 13 wherein the angle is approximately 90°.

15. A transmission fluid filter assembly as defined in claim 1 wherein said sheet metal members are of quadrilateral configuration in plan including opposite short and long sides each perpendicular to a third side and a fourth angular side intersecting said short side at an obtuse angle and said longer opposite side at an acute angle.

16. A transmission fluid filter assembly as defined in claim 15 wherein said filter media sheet member is spaced inwardly and generally parallel with the plied peripheral structure extending along the angular side of said sheet metal members.

17. A transmission fluid filter assembly as defined in claim 16 wherein the angle is approximately 90°.

* * * * *